UNITED STATES PATENT OFFICE.

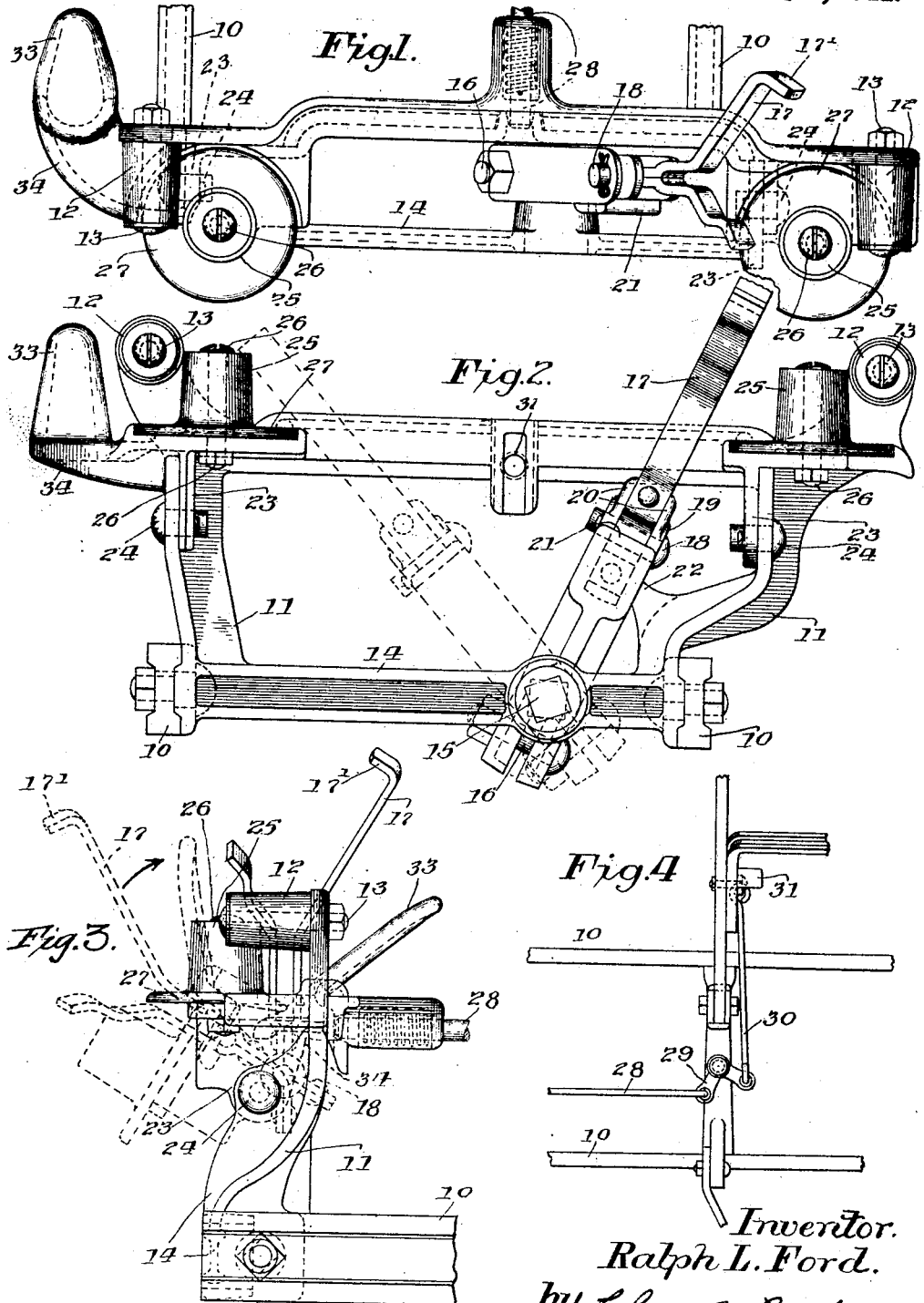
R. L. FORD.
CHECK WIRE GUIDE FOR HILL DROP PLANTERS.
APPLICATION FILED NOV. 19, 1917.
1,376,522. Patented May 3, 1921.
Inventor.
Ralph L. Ford.
by Chas. E. Lord
Atty

RALPH L. FORD, OF CHICAGO, ILLINOIS, ASSIGNOR, BY MESNE ASSIGNMENTS, TO INTERNATIONAL HARVESTER COMPANY, A CORPORATION OF NEW JERSEY.

CHECK-WIRE GUIDE FOR HILL DROP-PLANTERS.

1,376,522.  Specification of Letters Patent.  Patented May 3, 1921.

Application filed November 19, 1917. Serial No. 202,780.

*To all whom it may concern:*

Be it known that I, RALPH L. FORD, a citizen of the United States, residing at Chicago, in the county of Cook and State of Illinois, have invented certain new and useful Improvements in Check-Wire Guides for Hill Drop-Planters, of which the following is a full, clear, and exact specification.

My invention relates to check wire guiding mechanism for corn planters of the check row type.

In the operation of corn planters of the check row type, after the operator has planted a row of corn, the check wire must be discharged from the guiding mechanism on the corn planter and the planter must be turned in order to start the next row. After the planter has been turned and the check wire has been reset for the new row, with the present machines it is necessary for the operator to go to the side of the machine, place the check wire in position between the bifurcated ends of the fork and throw the pivoted portion of the check wire guiding mechanism into closed position on the frame. This, it will be readily seen, consumes a considerable amount of time, and the object of the present invention is to facilitate the resetting of the check wire in the check wire fork and the closing of the pivoted portion of the check wire guiding mechanism.

In the drawings, I have illustrated one embodiment of my invention and in these drawings, Figure 1 is a top plan view of the check wire guiding mechanism;

Fig. 2 is a side elevation of the structure shown in Fig. 1;

Fig. 3 is an end elevation of the guiding mechanism; and

Fig. 4 is a plan view of the mechanism for releasing the movable section of the guiding mechanism.

I have illustrated my invention in connection with the standard type of check row corn planter such, for instance, as is illustrated in Patent No. 1,041,976, to Dennis, et al., October 22, 1912. It will be understood that the construction is the same on both sides of the planter and that the mechanism on one side only of the machine has been illustrated.

Referring now to the drawings, the planter is provided with the usual transverse supporting bars 10 to which is secured a vertically extending bracket 11 carrying at its upper end two outwardly extending horizontally mounted guiding rolls 12. These rolls are mounted on horizontal pivot pins 13 and are freely rotatable thereon. The bracket 11 has a base portion 14 in which is journaled the trip shaft 15, and secured to this shaft 15 by means of a clamping bolt 16 is the bifurcated check wire fork 17. This fork is pivoted on a transverse pivot pin 18 which in turn is carried by upwardly projecting lugs 20 formed on the main portion of the supporting bracket 19 for the fork 17. The inner tine of the fork is larger than the outer tine and is bent outwardly as shown at 17' to prevent the accidental discharge of the check wire from the fork during resetting of the guiding mechanism. The outer tine of the fork is also curved outwardly to assist in guiding the wire into operative position. The supporting bracket 19 is also provided with the usual stop 21 which limits the outward pivotal movement of the fork 17. The bracket 11 at the right of the supporting bracket 19 carries an inwardly projecting lug 22, which limits the rearward movement of the supporting bracket and fork 17.

As is usual with this type of operating mechanism, the trip shaft 15 normally occupies the position shown in Fig. 2, being returned to this position by suitable springs after the fork and shaft have been actuated by the check wire. The movable or pivoted section of the guiding mechanism is provided with downwardly extending lugs 23 which are pivoted on pins 24 to the supporting bracket 11. This movable section carries on its upper surface guiding rollers 25 which are mounted on vertical pivot pins 26 and are freely rotatable thereon. When the movable section is in closed position and the check wire is operating, the wire rests on horizontal flanges 27 formed on the rollers or spools 25, and is held in this position and against vertical displacement by the horizontal rollers 12 above referred to. The movable section is held in its closed position by a spring-pressed latch 28 which is slidably mounted in an inwardly extending lug carried by the supporting bracket 11. This latch 28 is extended inwardly as shown in Fig. 4, and is connected to one end of a bell crank lever 29, the other end of which carries a link 30, the opposite end of the link 30 being pivoted to a suitable foot lever 31 by means of which the latch 28 may be withdrawn from the perforation 32 and the pivoted section of the guiding mechanism, to release this section when it is desired to discharge the wire and turn the machine.

To facilitate the replacing of the wire on the guiding mechanism and the closing of the pivoted latch member, I have provided on the pivoted section of the guiding mechanism an upwardly extending guiding lug 33 which is formed integral with the inwardly curved end 34 of the pivoted section.

It will be readily seen from the location of this lug 33 as shown in Figs. 1 and 3, that the operator by resting the wire against this lug, can guide the wire downwardly against the flange 27 of the spools 25. When the wire reaches this position, a side thrust exerted on the lug in the direction of the arrow in Fig. 3, will cause the pivoted section to be thrown home or into closed position, where it will be automatically held by means of the spring latch 28 above described. Thus it will be seen that the operator can easily and quickly close this guiding section at the same time that he resets the stake for the new row, and that it will not be necessary for him to go to the side of the machine and perform this operation manually, thereby delaying the planting and consuming valuable time.

From the above description of the construction and operation of this device, it is clear that this construction is of general application to all corn planters of the check wire type, and the advantages inherent in this structure will be obvious.

While I have in the above specification described one specific embodiment which my invention may assume, it will be understood that many modifications could be made without departing from the spirit and scope of the invention as expressed in the following claims.

What I claim as new is:

1. In a check-row planter, check-wire mechanism comprising a fixed and a tiltable section, a tiltable check-wire fork movable with said tiltable section and having the end of its inner arm extended toward its outer arm and means on the tiltable section for engaging a check-wire in coöperation with said fork and adapted to return them from tilted position by a side thrust from the wire.

2. A check-wire fork having diverging arms and having the ends of the arms bent laterally in the same direction.

In testimony whereof I affix my signature.

RALPH L. FORD.